US009794725B2

(12) United States Patent
Vogedes et al.

(10) Patent No.: US 9,794,725 B2
(45) Date of Patent: Oct. 17, 2017

(54) METHOD AND SYSTEM FOR FACILITATING WIRELESS COMMUNICATION VIA ALTERNATE COMMUNICATION PATHWAY

(71) Applicant: Google Technology Holdings LLC, Mountain View, CA (US)

(72) Inventors: Jerome Vogedes, Milwaukee, WI (US); Ajit Kumar Panda, Vernon Hills, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 461 days.

(21) Appl. No.: 14/146,141

(22) Filed: Jan. 2, 2014

(65) Prior Publication Data
US 2014/0112329 A1    Apr. 24, 2014

Related U.S. Application Data

(63) Continuation of application No. 12/981,360, filed on Dec. 29, 2010, now Pat. No. 8,630,231.

(51) Int. Cl.
*H04W 4/00*    (2009.01)
*H04W 24/02*    (2009.01)
(Continued)

(52) U.S. Cl.
CPC ........... *H04W 4/001* (2013.01); *H04W 24/02* (2013.01); *H04W 40/248* (2013.01); *H04W 76/02* (2013.01); *H04W 88/06* (2013.01)

(58) Field of Classification Search
CPC ... H04W 4/001; H04W 40/248; H04W 24/02; H04W 76/02; H04W 88/06
(Continued)

(56) References Cited

U.S. PATENT DOCUMENTS

2005/0083843 A1    4/2005 Pinault
2006/0154691 A1    7/2006 Tang et al.
(Continued)

FOREIGN PATENT DOCUMENTS

EP    2045968 A1    4/2009
WO    2009146741 A1    12/2009

OTHER PUBLICATIONS

United States Patent and Trademark Office, "Non-Final Rejection" for U.S. Appl. No. 12/981,352 dated Dec. 27, 2012, 24 pages.
(Continued)

*Primary Examiner* — Obaidul Huq
(74) *Attorney, Agent, or Firm* — Faegre Baker Daniels LLP

(57) ABSTRACT

A mobile device system and related method are disclosed by which the device is able to communicate wirelessly not only via a Wide Area Network (WAN) link but also via an alternate link such as a Wi-Fi link. In one embodiment, the method includes receiving a command from a remote server, via the WAN link, to establish a Wi-Fi link when possible. The method further includes, upon establishing the Wi-Fi link, sending a message for receipt by the server indicating that the Wi-Fi link has been established, and receiving software update information from the server, the information being communicated to the mobile device via the Wi-Fi link. Further, the method includes one or both of (1) sending an acknowledgement for receipt by the server indicating that the information has been received and (2) receiving an instruction from the server that communications via the Wi-Fi link be ended.

18 Claims, 5 Drawing Sheets

(51) Int. Cl.
*H04W 40/24* (2009.01)
*H04W 76/02* (2009.01)
*H04W 88/06* (2009.01)

(58) Field of Classification Search
USPC ............ 370/310, 328, 338, 351, 389, 395.1,
370/395.2, 400, 464, 465, 466; 455/403,
455/421.1, 426.1, 39, 41.2, 41.3
See application file for complete search history.

(56) References Cited

U.S. PATENT DOCUMENTS

| | | | |
|---|---|---|---|
| 2006/0234632 A1* | 10/2006 | Lin | H04W 8/245 455/41.2 |
| 2007/0270145 A1* | 11/2007 | Feng | H04W 36/18 455/436 |
| 2008/0141239 A1 | 6/2008 | Larsson et al. | |
| 2008/0293404 A1 | 11/2008 | Scherzer et al. | |
| 2008/0305738 A1 | 12/2008 | Khedouri et al. | |
| 2009/0156217 A1* | 6/2009 | Bajpai | H04W 36/14 455/439 |
| 2010/0177711 A1 | 7/2010 | Gum | |
| 2010/0188975 A1 | 7/2010 | Raleigh | |
| 2010/0302958 A1* | 12/2010 | Wietfeldt | H04W 76/025 370/252 |
| 2011/0040867 A1 | 2/2011 | Kalbag | |

OTHER PUBLICATIONS

United States Patent and Trademark Office, "Non-Final Rejection" for U.S. Appl. No. 12/981,352 dated May 15, 2013, 23 pages.
Research in Motion, "Wi-Fi Enabled BlackBerry Smartphones", 2008, 24 pages.
Patent Cooperation Treaty, "PCT Search Report and Written Opinion of the International Searching Authority" for International Application No. PCT/US2011/065958 Feb. 21, 2012, 16 pages.

* cited by examiner

METHOD AND SYSTEM FOR FACILITATING WIRELESS COMMUNICATION VIA ALTERNATE COMMUNICATION PATHWAY

CROSS-REFERENCE TO RELATED APPLICATIONS

The present application is a continuation of each of, and claims the benefit of each of, U.S. patent application Ser. No. 12/981,360 having the same title as the present application and filed on Dec. 29, 2010, and U.S. patent application Ser. No. 12/981,352 having the same title as the present application and filed on Dec. 29, 2010, and the present application hereby incorporates by reference the contents of each of the aforementioned other U.S. patent applications.

FIELD OF THE INVENTION

The present invention relates to mobile devices and other devices with which the mobile device can communicate and related methods of operation, and more particularly to such devices and related methods of operation in which there is a possibility of communication of information to and/or from mobile devices by way of more than one communication pathway.

BACKGROUND OF THE INVENTION

As mobile devices such as cellular telephones and smart phones become more powerful in their capabilities, operation of the mobile devices increasingly involves the receipt and/or transmission of ever larger quantities of information. Such information can include content communicated from or to content provider websites (CPWs), which can be understood to encompass a variety of interactive websites that allow for the downloading and/or uploading (e.g., posting) of various forms of information including, for example, social networking websites (SNWs), news feeds, music and photograph websites, as well as other types of websites such as business-to-business (b2b) or business-to-consumer (b2c) websites. Also, the information received and/or transmitted by a mobile device can also include, for example, software updates allowing for modifications and/or supplements to be provided in relation to a variety of software program(s) that are implemented on the mobile device.

Many mobile devices operate to receive and/or transmit information by way of cellular networks such as 2G and, more commonly today, 3G cellular networks, among others. The information communicated in this manner can include both information being communicated to or from CPWs as well as software updates as mentioned above. While such information can be successfully communicated to and from mobile devices by way of such cellular networks, this conventional manner of communicating information is not always ideal. Among other things, wireless carriers are often concerned about the volume of information being communicated via the cellular networks since attempts to communicate large or excessive amounts of information can overly tax or overload the cellular networks such that the information can only ultimately be communicated at an undesirably slow pace or in a manner that may be disruptive to other communications being handled by the cellular networks. In some cases, communication of information may need to be stopped and started (or restarted) before it ultimately is completed.

With respect to software updates in particular, to the extent that a given mobile device is already performing other activities involving cellular communications when the wireless carrier (or other source of a software update) attempts to commence the software update, the performing of the software update may need to be deferred and reattempted at a later time when the mobile device is not busy. This is disadvantageous not only for the specific mobile device that is busy since installation of the software update on that mobile device is delayed, but also for the wireless carrier (or other source of the software update) attempting to install the software update. Indeed, it is often desired that a given software update be commonly applied to multiple (e.g., many thousands of) mobile devices as part of a network-wide rollout of the update. Assuming that not just one but many mobile devices may be unreceptive to a given software update at the time(s) when it is first provided, in practice it can often take a long period of time (e.g., several days) for a wireless carrier (or other source of the update) to successfully apply the update in relation to all of the mobile devices for which that update is intended.

Additionally, it may also be undesirable to mobile device users for their mobile devices to receive or transmit such information via cellular network connections. For example, it may be undesirable to a mobile device user for his or her mobile device to receive a software update via a cellular network connection if the mobile device user is also desiring that connection to be used for other purposes (e.g., for communication with a CPW). This is especially the case given that the downloading of some software updates via cellular network connections can take a relatively long period of time (e.g., ten minutes), during which period other cellular network communications may not be possible. Further, in some cases, wireless carriers charge mobile device users extra fees when the amounts of information communicated between the users' mobile devices and the cellular networks exceed specified amounts. Given such fees, users may find it undesirable for their mobile devices to send or receive particular types or information via cellular networks.

It would therefore be advantageous if improved mobile devices and/or other devices with which the mobile device can communicate, and/or related methods of operation could be developed that would help to address, at least partly, one or more concerns such as those discussed above.

SUMMARY OF THE INVENTION

In at least one embodiment, the present invention relates to a method of operating the mobile device with respect to a mobile device capable of communicating wirelessly via a Wide Area Network (WAN) communication link. The method includes receiving a command from a remote server, via the WAN communication link, to establish a Wi-Fi communication link when possible, and taking at least one action so as to establish the Wi-Fi communication link. The method further includes, upon establishing the Wi-Fi communication link, sending a message for receipt by the remote server indicating that the Wi-Fi communication link has been established. The method also includes receiving software update information from the remote server, the software update information being communicated to the mobile device via the Wi-Fi communication link. Further, the method includes one or both of (1) sending an acknowledgement for receipt by the remote server indicating that the software update information has been received and (2) receiving an instruction from the remote server that communications via the Wi-Fi communication link be ended.

In at least one additional embodiment, the present invention relates to a mobile device capable of conducting both Wide Area Network (WAN) communications and Wi-Fi communications. The mobile device includes at least one memory portion storing a first program that is either a browser program or another client program. The mobile device further includes a first communication device having one or both of a first transmitter and a first receiver capable of conducting the WAN communications via a WAN communication link, and a second communication device having one or both of a second transmitter and a second receiver capable of conducting the Wi-Fi communications via a Wi-Fi communication link. The mobile device also includes at least one processor portion at least indirectly in communication with each of the at least one memory portion, the first communication device, and the second communication device. Upon receiving, from a remote server via the WAN communication link, a command to establish the Wi-Fi communication link when possible, the second communication device conducts the Wi-Fi communications. Further, the first program is executed by the at least one processor portion so that, as a result of the Wi-Fi communications, software update information from the remote server is received and stored upon the at least one memory portion of the mobile device.

In at least one additional embodiment, the present invention relates to a method of operating a mobile device that is capable of communicating wirelessly via a Wide Area Network (WAN) communication link. The method includes receiving a command from a remote server, via the WAN communication link, to establish a Wi-Fi communication link when possible. The method also includes sending a request for receipt by the remote server, via the WAN communication link, for credential information, and receiving the credential information via the WAN communication link as provided by the remote server. The method further includes taking at least one action so as to establish the Wi-Fi communication link, and receiving software update information from the remote server, the software update information being communicated to the mobile device via the Wi-Fi communication link.

DETAILED DESCRIPTION

Figure 1:
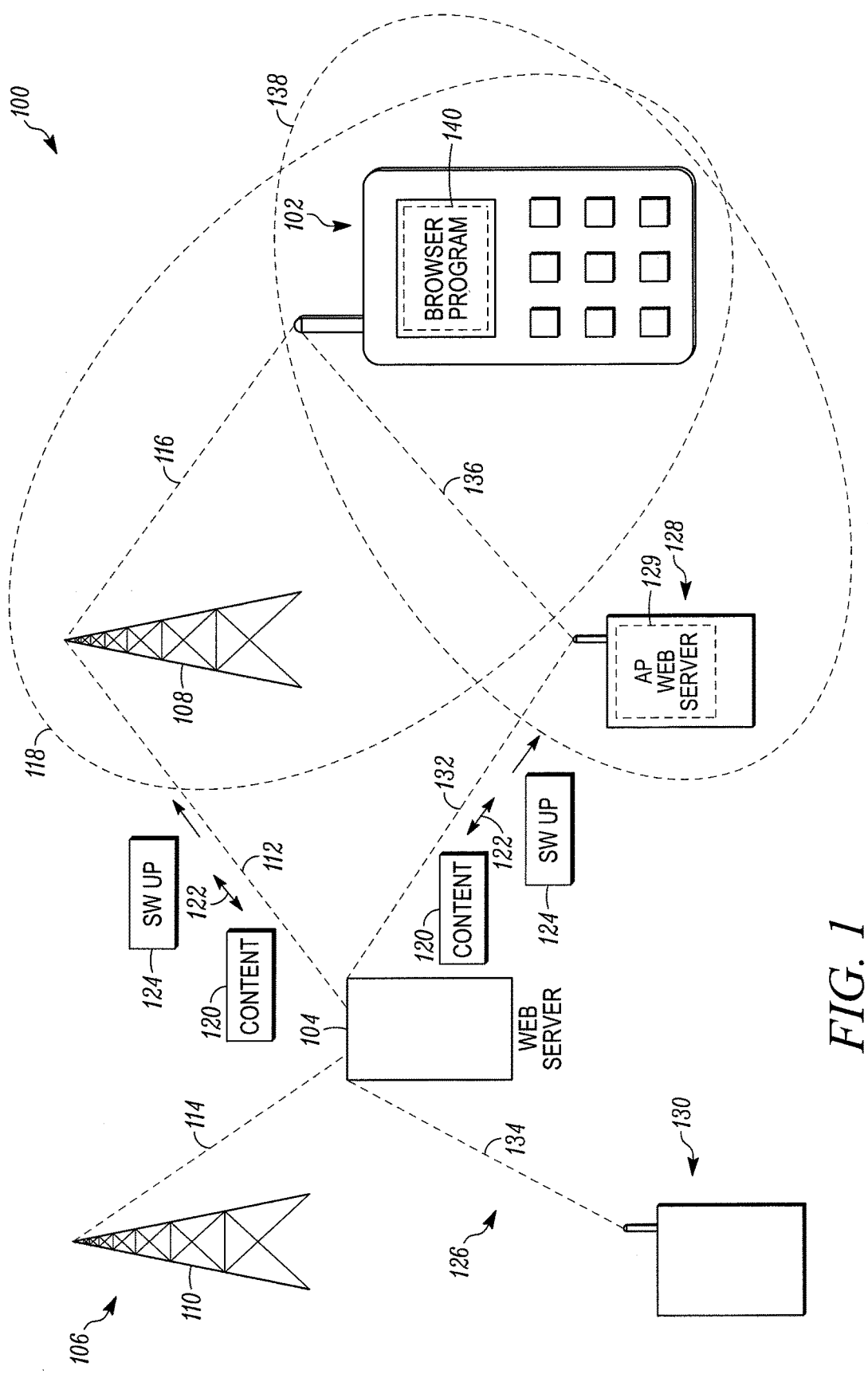
FIG. 1 shows in schematic form an example communications system involving a plurality of electronic devices in communication with a plurality of content provider websites, where some of the communications occur via an intermediary server.

Referring to FIG. 1, a block diagram of an example communications system 100 is shown in a simplified schematic form. As shown, the communications system 100 includes in this embodiment a mobile device 102 that is indirectly in communication with a server, which in the present embodiment is a web server 104 (e.g., a server that supports internet protocols or otherwise is capable of interaction with the internet or World Wide Web). The mobile device 102 in the present embodiment is capable of communicating with the web server 104 by way of at least two different wireless communication networks, either simultaneously or at least at different times. A first of the wireless communication networks is a cellular network 106 including first and second cell towers 108 and 110, respectively, as well as first, second, and third communication links 112, 114, and 116, respectively. The first of the wireless communication networks can also be considered a Wide-Area Network (WAN). As for the second of the wireless communication networks, this is a Wi-Fi network 126 including first and second access points 128 and 130, respectively, as well as first, second, and third communication links 132, 134, and 136, respectively. The access points 128, 130 can also in at least some circumstances be "hot spots" serving as publicly-accessible wireless internet connection transceivers such as are found with increasing frequency in public or semi-public venues such as malls, restaurants, stores, hotels, etc.

As shown, the first and second communication links 112 and 114 respectively represent connections (wireless or otherwise) between the web server 104 and the first and second cell towers 108 and 110, respectively, while the third communication link 116 is a wireless connection between the mobile device 102 and the first cell tower 108. The third communication link 116 particularly is formed between the mobile device 102 and the first cell tower 108 because the mobile device is within a coverage region (or zone) 118 of the first cell tower, even though it is not within a coverage region (not specifically shown in FIG. 1) of the second cell tower 110. If the mobile device 102 is moved, it may no longer be within coverage region 118 and consequently the third communication link 116 may be broken.

As for the first and second communication links 132 and 134, these respective links represent connections (wireless or otherwise) between the web server 104 and the first and second access points 128 and 130, respectively, while the third communication link 136 is a wireless connection between the mobile device 102 and the first access point 128. The third communication link 136 particularly is formed between the mobile device 102 and the first access point 128 because the mobile device is within a coverage region (or zone) 138 of the first access point, even though it is not within a coverage region (not specifically shown in FIG. 1) of the second access point 130. If the mobile device 102 is moved, it may no longer be within coverage region 138 and consequently the third communication link 136 may be broken.

Typically, the cellular network 106 is designed so that the mobile device 102 when leaving one coverage region such as the coverage region 118 will be correspondingly entering (or will have already entered) another coverage region (e.g., such as a coverage region of the second cell tower 110) such that the mobile device can remain in contact with the cellular network in a seamless or nearly seamless manner within a large geographic area. By contrast with the coverage zones of the cellular network 106, which are often overlapping or contiguous so as to allow for largely seamless communication coverage for the mobile device 102 within a large geographic region, commonly the coverage zones associated with the access points of the Wi-Fi network 126 are not overlapping or contiguous, at least not to a high degree. Consequently, it can be understood that when the mobile device 102 leaves the coverage region 138 of the first access point 128, it will no longer be in communication with the Wi-Fi network 126, at least for a period of time until it enters another coverage zone of an access point of that network.

The mobile device 102 is representative of wireless communication devices operated by persons (or users) or possibly by other entities (e.g., other computers) desiring or requiring wireless communication capabilities. In some embodiments, for example, the mobile device 102 can be a device selected from among a variety of types of cellular telephones, personal digital assistants (PDAs), smart phones, other handheld or portable electronic devices, headsets, MP3 players, battery-powered devices, wearable devices, radios, navigation devices, laptop or notebook computers, netbooks, pagers, PMPs (personal media players), DVRs (digital video recorders), gaming devices, cameras, netbooks, e-readers, e-books, tablet devices, navigation devices with video capable screens, multimedia docking stations, or other mobile devices.

As for the web server 104, this device can take a variety of forms depending upon the embodiment. Although only the single web server 104 is shown in FIG. 1, it should be understood that this is only for simplicity of illustration and, in practice, the mobile device 102 can often be in communication (simultaneously or substantially simultaneously, or at different times) with multiple web servers rather than just a single web server by way of wireless communication networks such as the cellular network 106 and the Wi-Fi network 126. Also, it should further be understood that, while in the present embodiment the mobile device 102 is shown to be in communication with the web server 104 (or multiple web servers), depending upon the embodiment the mobile device 102 can also or instead be in communication with one or more other types of servers (e.g., servers that are not web-based, that is, do not engage in communications via the World Wide Web) or other devices that are not servers. That is, FIG. 1 should be understood to represent on a most general level wireless communications between a mobile device and any arbitrary number of any arbitrary type(s) of devices.

Figure 4:
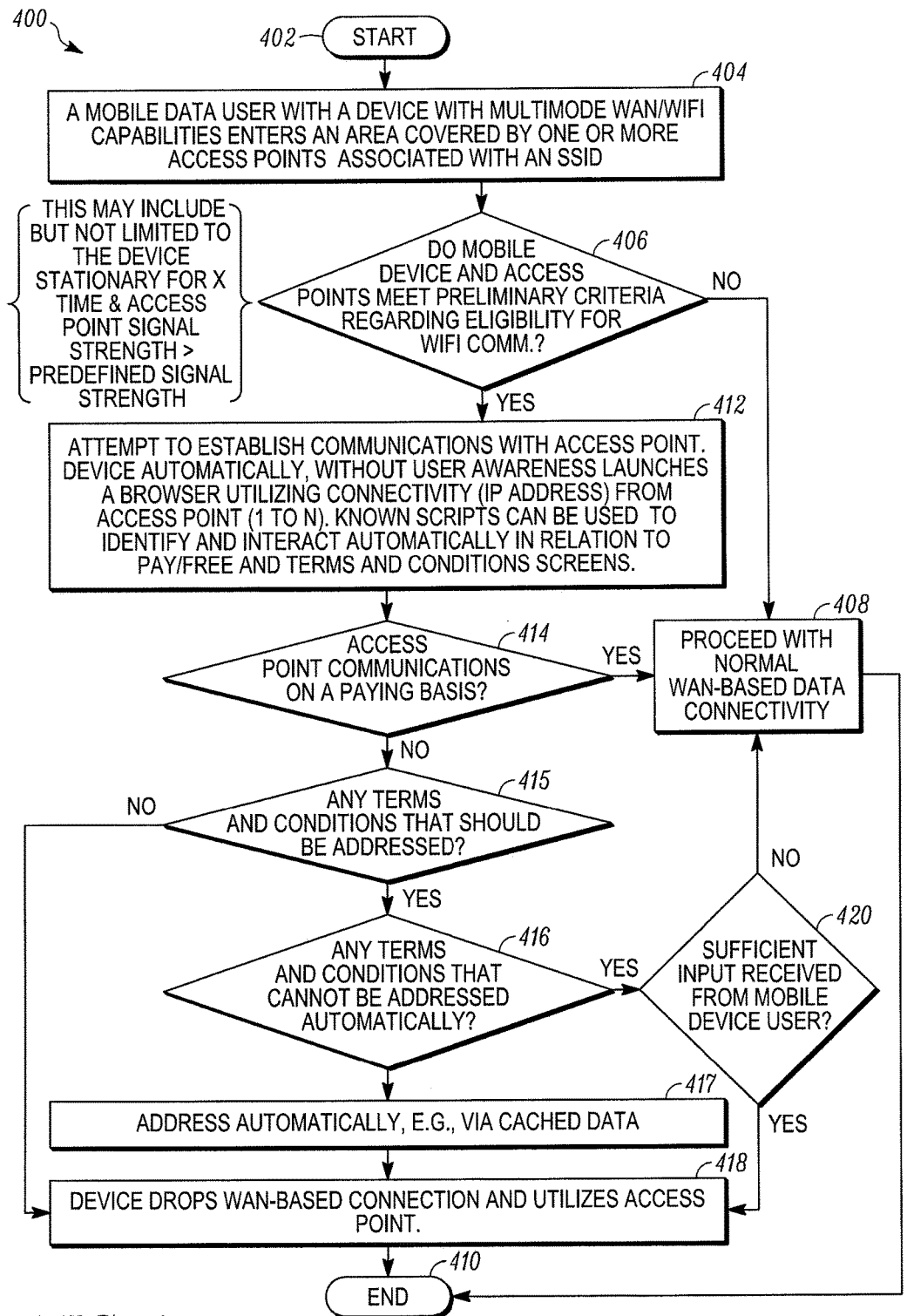
FIG. 4 is a flow chart showing various example steps of operation of some of the components of the system of FIG. 1 as those components interact with one another in various manners, in at least some embodiments.

In some embodiments, and as will be assumed for purposes of discussion with respect to FIG. 4, the web server 104 can more particularly be a content provider website (CPW), which can be understood generally to encompass any of a variety of interactive websites including, for example, social networking websites (SNWs), business-to-business websites, business-to-consumer websites, news feeds, music and/or photograph websites, and/or other websites that allow for the downloading, uploading (e.g., posting), and/or other accessing of various forms of information or data (which can be considered "content") 120. Examples of such CPWs include, for example, Facebook™, MySpace™, hi5™, LinkedIn™, and Twitter™, as well as sources of RSS (Really Simple Syndication) or other news feeds, photograph services such as Picasa™ or Photobucket™, and music services such as LastFM™. Examples of the content 120 can include personal and/or business information, news information, weather information, pictures, videos, and songs. Generally speaking, the CPWs can encompass any websites to or from which the content 120 can be uploaded and/or downloaded (as indicated by double-headed arrows 122) from or to mobile devices such as the mobile device 102.

Figure 3:
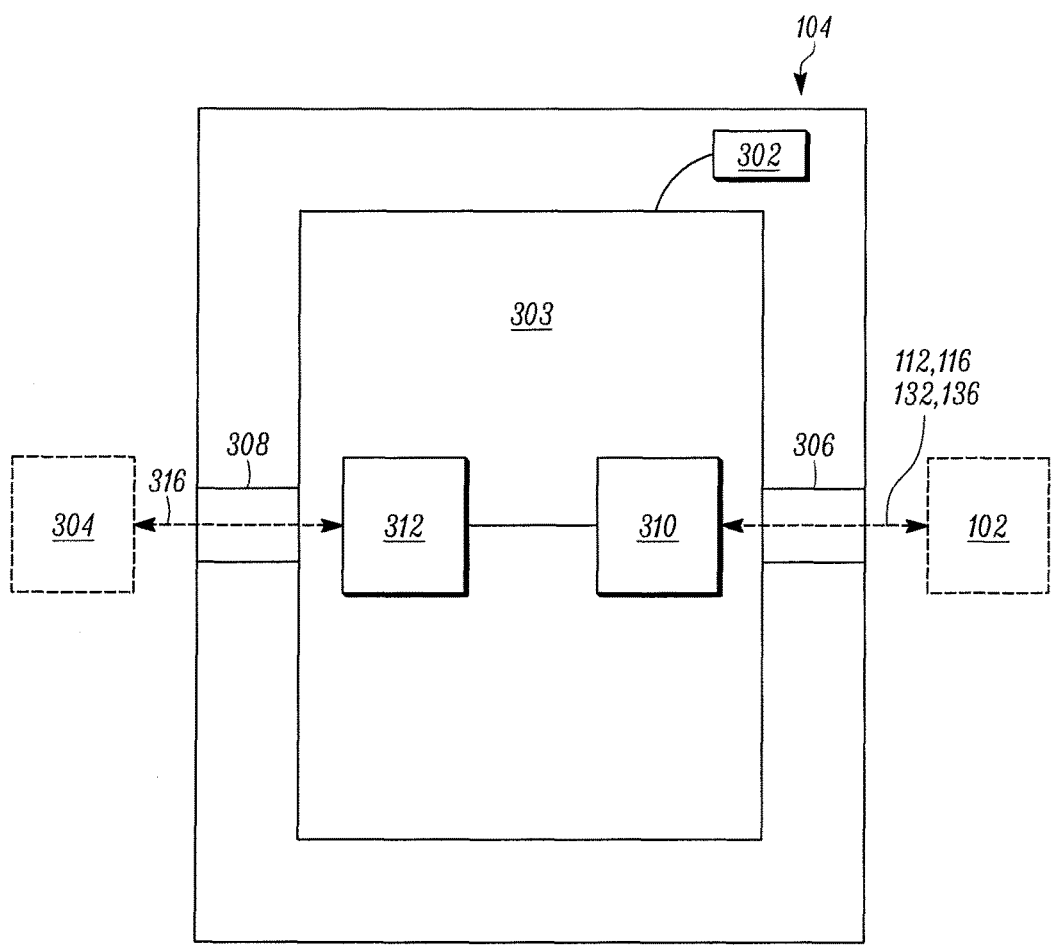
FIG. 3 is a block diagram showing example components of the intermediary server of FIG. 1.
Figure 5:
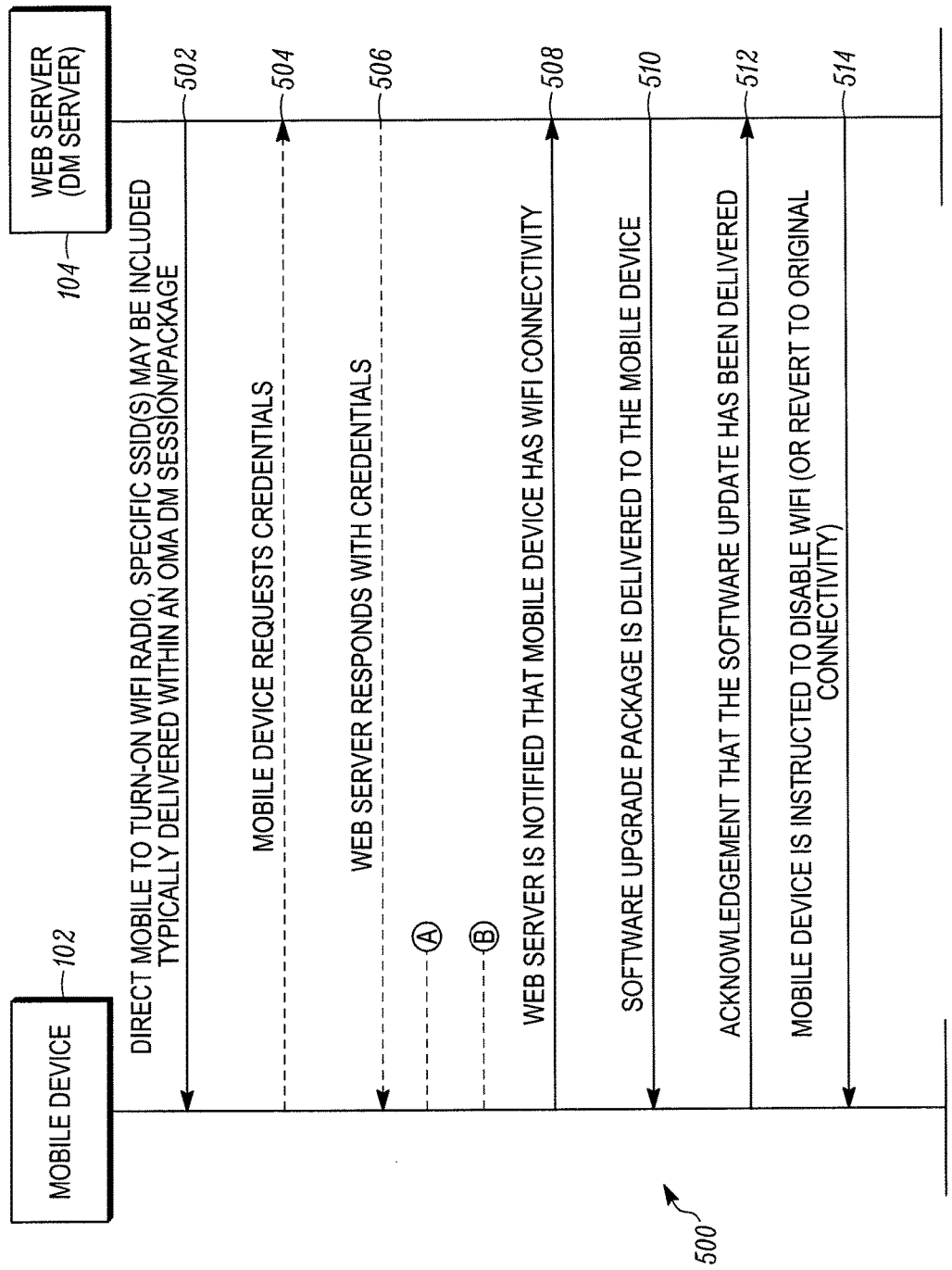
FIG. 5 is a schematic diagram showing further steps of operation of some of the components of the system of FIG. 1 as those components interact with one another in various manners, in at least some embodiments.

In other embodiments, and as will be assumed for purposes of discussion with respect to FIGS. 3 and 5, the web server 104 is configured to serve as an intermediary between the mobile devices 102 and other devices (not shown), where the other devices can for example be one or more CPWs. In some such embodiments, the web server 104 can be (but need not be) operated by and/or otherwise affiliated with a manufacturer of the mobile device 102. Operating in this manner, the web server 104 allows for various types of communications to occur between the mobile device 102 and other devices (e.g., CPWs), where the communicated information is passed through, processed and/or monitored by the web server 104. Such communications can involve, for example, the uploading and downloading of files (e.g., photos, music, videos, text entries, etc.), blog postings, and messaging (e.g., Short Message Service (SMS), Multimedia Messaging Service (MMS), and Instant Messaging (IM)). When operating as an intermediary in this manner, the web server 104 can communicate with the CPW(s) or other devices by way of a variety of communication links or mechanisms including, in at least some embodiments, additional communication links that are part of the cellular network 106 or Wi-Fi network 126.

As will be discussed further particularly in relation to the FIG. 5, the web server 104 can in some circumstances serve as a source of one or more software updates such as a software update 124 shown in FIG. 1 that are intended for receipt at and installation upon the mobile device 102. This can be the case when the web server 104 is one of the CPWs, or when the web server 104 is an intermediary (e.g., an intermediary operated by or affiliated with a manufacturer of the mobile device 102 as mentioned above), or when the web server 104 takes another form. For example, in some circumstances the web server 104 can be a server operated by and/or otherwise affiliated with the wireless carrier (mobile communication network operator) operating the cellular network 106 and/or the Wi-Fi network 126. With respect to such software updates/upgrades, it should be understood that the software that can be updated in any given instance can encompass a wide variety of types of software including applications, programs, firmware, and patches. The software updates/upgrades can, depending upon the embodiment, involve one or both of modifications to existing software already residing on the mobile device 102 as well as the installation of entirely new software, applications or programs on the mobile device 102.

In at least some embodiments it should be also understood that the access points themselves can have web servers (or other server functionality) residing thereon or associated therewith. FIG. 1 shows, for example, such an AP web server 129 to be residing on the first access point 128. Such web server(s) can in some embodiments be provided to govern or influence how or under what circumstances the access points can interact with various mobile devices such as the mobile device 102. In some such embodiments, as discussed further below, a web server residing on or associated with an access point (e.g., the AP web server 129) can be considered a "re-direct server" or "captive portal" that is first accessed when a mobile device such as the mobile device 102 first attempts to access the access point.

Further in this regard, when a browser-equipped mobile device such as the mobile device 102 attempts to first establish communications with an access point such as the first access point 128, the mobile device initially is directed to the re-direct server (or a home page or web page thereof) for interaction therewith before other communications with other web servers can occur via the access point, even if accessing of another web server such as the web server 104 (or home page or web page thereof) has already been requested. That is, the mobile device 102 is only allowed by the first access point 128 to access one specific Universal Resource Locator (URL) that is associated with the re-direct server/captive portal, as specified by that access point. That said, although a web server that is locally-based at the access point such as the AP web server 129 can sometimes serve as the re-direct server or captive portal, the re-direct server/ captive portal need not always be locally-based at the access point but rather can be located remotely from the access point.

With respect to the communication links 112, 114, 116, 132, 134, 136 shown in FIG. 1, while the respective third communication links 116 and 136 are both representative of wireless signals transmitted through the air/atmosphere between the mobile device 102 and the cell tower 108 and access point 128, respectively, the other ones of the communication links 112, 114, 132, 134 are intended to be more generally representative of any of a variety of types of communication paths by which the cell tower and access point can communicate with the web server 104. Thus, depending upon the embodiment, the communication links 112, 114, 132, 134 can each include one or more wired and/or wireless communication pathways, for example, landline (e.g., fiber optic, copper) wiring, microwave communication, radio channel, wireless path, intranet, internet, and/or World Wide Web communication pathways (which themselves can employ numerous intermediary hardware and/or software devices including, for example, numerous routers, etc.).

In addition, a variety of communication protocols and methodologies can be used to conduct web-based communications via the communication links 112, 114, 116, 132, 134, 136 between the mobile device 102 and web server 104, including for example, transmission control protocol/internet protocol (TCP/IP), extensible messaging and presence protocol (XMPP), file transfer protocol (FTP), etc. In other embodiments, other types of protocols or communications techniques can be utilized to achieve web-based and/or internet-type communications. To enable or facilitate such web-based communications, in the present embodiment the mobile device 102 has stored thereon at least one browser program (application) 140 that allows the mobile device to operate as a client relative to web-based servers such as the web server 104 and the AP web server 129 mentioned above. As discussed further below, the browser program 140 can be helpful for example in establishing communications via the Wi-Fi network 126. Although the present embodiment envisions the presence of browser program(s) such as the browser program 140 allowing for the mobile device to operate as a client, in other embodiments (e.g., that of FIG. 5, where the web server 104 is a device management server as discussed further below) other programs allowing for the mobile device to operate as a client can be employed instead of, or in addition to, such browser program(s).

Notwithstanding the above discussion, in some alternate embodiments (for example, some embodiments where the web server 104 is replaced by other types of servers or other types of devices), it should be understood that a variety of other types of communication links for facilitating the transfer of signals between the mobile device 102 and such other devices can be utilized. Among other things, although in the present embodiment involving the web server 104 the networks 106, 126 and communication links 112, 114, 116, 132, 134, 136 conduct web-based, internet-type communications, in other embodiments the networks/communication links can assume various non-web-based forms and need not involve the internet, and correspondingly internet-type protocols need not be employed in such embodiments.

Figure 2:
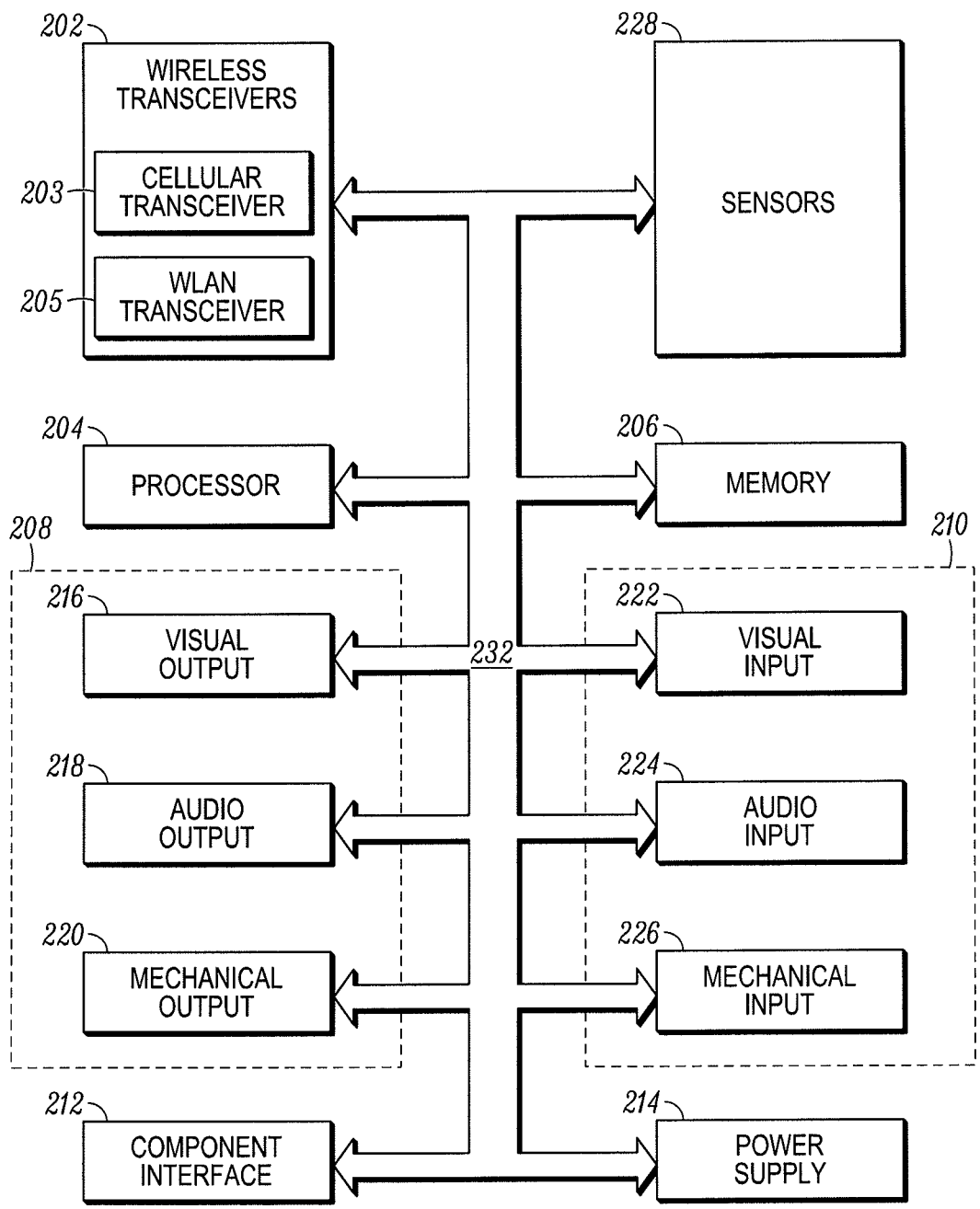
FIG. 2 is a block diagram showing example components of one of the electronic devices of FIG. 1.

Referring to FIG. 2, there is provided a block diagram illustrating example internal components 200 of the mobile device 102 of FIG. 1, in accordance with the present embodiment. It should be understood that, while the internal components 200 are present in the mobile device 102, all of these internal components need not be present in every mobile device that might communicate with the web server 104 (or with other devices) via the cellular network 106 and/or Wi-Fi network 126. That said, as shown in FIG. 2, the components 200 include multiple wireless transceivers 202, a processor 204 (e.g., a microprocessor, microcomputer, application-specific integrated circuit, etc.), a memory portion 206, one or more output devices 208, and one or more input devices 210. In at least some embodiments, a user interface is present that comprises one or more of the output devices 208, such as a display, and one or more of the input device 210, such as a keypad or touch sensor.

The internal components 200 can further include a component interface 212 to provide a direct connection to auxiliary components or accessories for additional or enhanced functionality. The internal components 200 preferably also include a power supply 214, such as a battery, for providing power to the other internal components while enabling the mobile device to be portable. Further, the internal components 200 additionally include one or more sensors 228. All of the internal components 200 can be coupled to one another, and in communication with one another, by way of one or more internal communication links 232 (e.g., an internal bus).

As will be evident from further discussion below, at least some embodiments of the present invention are directed to facilitating communications by the mobile device 102 that particularly involve switching between cellular-type communications and other types of wireless communications so as to thereby achieve one or more advantages. This being the case, in the present embodiment of FIG. 2, the wireless transceivers 202 particularly include a cellular transceiver 203 and a Wi-Fi transceiver 205. More particularly, the cellular transceiver 203 is configured to conduct 3G cellular communications vis-à-vis cell towers such as the first cell tower 108 (and potentially the second cell tower 110) albeit, in other embodiments, the cellular transceiver 203 can be configured to utilize any of a variety of other cellular-based communication technologies such as analog communications (using AMPS), digital communications (using CDMA, TDMA, GSM, iDEN, GPRS, EDGE, etc.), and/or next generation communications (using UMTS, WCDMA, LTE, IEEE 802.16, etc.) or variants thereof.

By contrast, the Wi-Fi transceiver 205 is a wireless local area network (WLAN) transceiver 205 configured to conduct Wi-Fi communications in accordance with the IEEE 802.11(a, b, g or n) standard with access points such as the first access point 128 (and potentially the second access point 130). In other embodiments, Wi-Fi transceiver 205 can instead (or in addition) conduct other types of communications commonly understood as being encompassed within Wi-Fi communications such as some types of peer-to-peer (e.g., Wi-Fi Peer to Peer) communications. Further, in other embodiments, the Wi-Fi transceiver 205 can be replaced or supplemented with one or more other wireless transceivers configured for non-cellular wireless communications including, for example, wireless transceivers employing ad hoc communication technologies such as HomeRF (radio frequency), Home Node B (3G femtocell), Bluetooth and/or other wireless communication technologies such as infrared technology. Thus, although in the present embodiment the mobile device 102 has two of the wireless transceivers 203 and 205, the present disclosure is intended to encompass numerous embodiments in which any arbitrary number of (e.g., more than two wireless transceivers) employing any arbitrary number of (e.g., two or more) communication technologies are present.

Example operation of the wireless transceivers 202 in conjunction with others of the internal components 200 of the first one 103 of the mobile devices 102 can take a variety of forms and can include, for example, operation in which, upon reception of wireless signals, the internal components detect communication signals and the transceiver 202 demodulates the communication signals to recover incoming information, such as voice and/or data, transmitted by the wireless signals (e.g., the content 120 and/or software update 124 of FIG. 1). After receiving the incoming information from the transceiver 202, the processor 204 formats the incoming information for the one or more output devices 208.

Likewise, for transmission of wireless signals, the processor 204 formats outgoing information, which can but need not be activated by the input devices 210, and conveys the outgoing information to one or more of the wireless transceivers 202 for modulation so as to provide modulated communication signals to be transmitted. The wireless transceiver(s) 202 convey the modulated communication signals by way of wireless (as well as possibly wired) communication links such as the communication links 116, 136 to other devices such as the first cell tower 108 and the first access point 128 (and potentially other cell towers and other access points such as the second cell tower 110 and the second access point 130), such that those signals (or signals derived from those signals) can proceed to other devices such as the web server 104.

Depending upon the embodiment, the input and output devices 208, 210 of the internal components 200 can include a variety of visual, audio and/or mechanical outputs. For example, the output device(s) 208 can include one or more visual output devices 216 such as a liquid crystal display and light emitting diode indicator, one or more audio output devices 218 such as a speaker, alarm and/or buzzer, and/or one or more mechanical output devices 220 such as a vibrating mechanism. The visual output devices 216 among other things can also include a video screen. Likewise, by example, the input device(s) 210 can include one or more visual input devices 222 such as an optical sensor (for example, a camera lens and photosensor), one or more audio input devices 224 such as a microphone, and one or more mechanical input devices 226 such as a flip sensor, keyboard, keypad, selection button, navigation cluster, touch pad, capacitive sensor, motion sensor, and switch. Operations that can actuate one or more of the input devices 210 can include not only the physical pressing/actuation of buttons or other actuators, but can also include, for example, opening the mobile device, unlocking the device, moving the device to actuate a motion, moving the device to actuate a location positioning system, and operating the device.

As mentioned above, the internal components 200 also can include one or more of various types of sensors 228. The sensors 228 can include, for example, proximity sensors (e.g., a light detecting sensor, an ultrasound transceiver or an infrared transceiver), touch sensors, altitude sensors, and one or more location circuits/components that can include, for example, a Global Positioning System (GPS) receiver, a triangulation receiver, an accelerometer, a tilt sensor, a gyroscope, or any other information collecting device that can identify a current location or user-device interface (carry mode) of the mobile device 102. While the sensors 228 are for the purposes of FIG. 2 considered to be distinct from the input devices 210, in other embodiments it is possible that one or more of the input devices can also be considered to constitute one or more of the sensors (and vice-versa). Additionally, while in the present embodiment the input devices 210 are shown to be distinct from the output devices 208, it should be recognized that in some embodiments one or more devices serve both as input device(s) and output device(s). For example, in embodiments where a touchscreen is employed, the touchscreen can be considered to constitute both a visual output device and a mechanical input device.

The memory portion 206 of the internal components 200 can encompass one or more memory devices of any of a variety of forms (e.g., read-only memory, random access memory, static random access memory, dynamic random access memory, etc.), and can be used by the processor 204 to store and retrieve data. In some embodiments, the memory portion 206 can be integrated with the processor 204 in a single device (e.g., a processing device including memory or processor-in-memory (PIM)), albeit such a single device will still typically have distinct portions/sections that perform the different processing and memory functions and that can be considered separate devices. The data that is stored by the memory portion 206 can include, but need not be limited to, operating systems, applications, and informational data.

Each operating system includes executable code that controls basic functions of the mobile device, such as interaction among the various components included among the internal components 200, communication with external devices via the wireless transceivers 202 and/or the component interface 212, and storage and retrieval of applications and data, to and from the memory portion 206. Each application includes executable code that utilizes an operating system to provide more specific functionality, such as file system service and handling of protected and unprotected data stored in the memory portion 206. Such operating system and/or application information can include software update information such as the software update 124 shown in FIG. 1 as being downloaded to the mobile device 102 (software update information can be understood to potentially encompass update(s) to either application(s) or operating system(s) or both).

As for informational data, this is non-executable code or information that can be referenced and/or manipulated by an operating system or application for performing functions of the mobile device. Additionally, among other things, informational data can include any of a variety of types of information that is uploaded from the mobile device 102 to the web server 104, downloaded to the mobile device from the web server 104, or otherwise accessed by the mobile device at the web server 104. To the extent that the web server 104 serves as an intermediary between the mobile device 102 and other device(s) such as one or more CPWs, informational data can also include information that is uploaded from the mobile device to such other device(s), downloaded to the mobile device from such other device(s), or otherwise accessed by the mobile device at such other device(s) with the web server 104 operating therebetween. The informational data can include, among other things, the content 120 mentioned with respect to FIG. 1.

Referring next to FIG. 3, example components of the web server 104 of FIG. 1 are shown in more detail with it being assumed for this example that the web server 104 is configured to act as an intermediary between the mobile device 102 and another device (e.g., a CPW) 304 as mentioned above (both the mobile device and the other device are shown in dashed lines). In this embodiment, as shown, the web server 104 includes a memory portion 302, a processor portion 303 in communication with that memory portion, and first and second input/output (I/O) interfaces 306 and 308, respectively. In the present embodiment, the first input/output (I/O) interface 306 is intended to interface the processor portion 303 with the communication links 112, 114, 116 and 118 and thus allow for communications between that processor portion of the web sever 104 and the mobile device 102 via those communication links (and additionally the third communication links 116, 136). In addition, the second input/output (I/O) interface 308 is intended to interface the processor portion 303 with the other device 304 via a communication link (or links) 316.

Further as shown in FIG. 3, the processor portion 304 also includes a front end portion 310 and a back end portion 312. The front end portion 310 communicates with the mobile device 102 via the communication links 112, 116, 132, 136 and the first I/O interface 306, and the back end portion 312 communicates with the other device 304 via the communication link 316 and the second I/O interface 308. In some embodiments, particularly where the other device 304 is a CPW and more particularly a SNW, the back end portion 312 can be referred to as a "Social Network Processor". In at least some embodiments the back end portion 312 further supports pull communications with the other device 304 (e.g., when the other device is a CPW). The pull communications can for example be implemented using Representation State Transfer (REST) architecture, of the type typical to the web. Assuming this to be the case, the back end portion 312 is configured to generate requests for information to be provided to the back end portion from the other device 304 at times/circumstances determined by the web server 104, in response to which the other device searches for and provides back to the web server requested data.

Also, in at least some embodiments the front end portion 310 establishes a push channel in conjunction with the mobile device 102. In at least some such embodiments, the push channel allows the front end portion 310 to provide notifications and/or device management commands (generated by the front end portion) from the web server 104 to the mobile device 102 at times/circumstances determined by the web server 104. With respect to notifications, these can be indicative of information content that is available to be provided to that mobile device 102. Upon receiving such notifications, the mobile device 102 in turn is able to respond to the notifications, in manner(s) deemed appropriate by the mobile device. Such responses often (but not necessarily always) constitute requests that some or all of the available information content be provided from the front end portion 310 of the web server 104 to the mobile device 102. As for device management commands, these can allow for the mobile device 102 to be configured for communication with appropriate access points such as the first access point 128.

Although FIG. 3 shows the web server 104 to be in communication with only the mobile device 102 and the other device 304, it should be understood that the web server is capable of communicating not only with those two devices but rather with multiple mobile devices by way of the first I/O interface 306 and/or multiple other devices by way of the second I/O interface 308. Further, notwithstanding the description provided with respect to FIG. 3, the web server 104 can take numerous other forms depending upon the implementation or embodiment. For example, even though the web server 104 in FIG. 3 has both of the first and second I/O interfaces 306, 308, in other embodiments only one interface or more than two interfaces are present. Also for example, in at least some circumstances, the web server 104 can be considered a cloud and further can encompass a collection of multiple servers that are in communication with one another and that, in at least some embodiments, support internet technologies for communication between entities. Also, in at least some embodiments, the web server 104 (or corresponding cloud or other intermediating device(s)) can employ web 2.0 functionality and beyond including, for example, further evolution of such functionality and/or new push functionality.

Turning now to FIGS. 4-5, two schematic diagrams are provided illustrating example operation of at least some of the components of the system 100 of FIG. 1. More particularly, FIG. 4 shows a flowchart 400 illustrating example steps of an operational process in which the mobile device 102 transitions between communications via the cellular network 106 and communications via the Wi-Fi network 126 to allow for the communication of information such as the content 120 and/or the software update 124 via the Wi-Fi network rather than the cellular network. By comparison, FIG. 5 shows a schematic diagram 500 illustrating example steps of another operational process in which the mobile device 102 transitions between communications via the cellular network 106 and communications via the Wi-Fi network 126 to allow for communication of a software update such as the software update 124 of FIG. 1.

In accordance with the processes shown in FIGS. 4 and 5, it is possible for operation of the system 100 to transition to communications via a WLAN such as the Wi-Fi network 126, assuming such network is available and meets one or more criteria as discussed further below, from communications via a WAN such as the cellular network 106. Thanks to such transitioned communications, the availability of local area network communications can be leveraged to reduce costs and/or ameliorate other disadvantages associated with using the cellular network 106 (or other WANs) to communicate information, and particularly to reduce costs and/or ameliorate other disadvantages associated with using the cellular network (or other WANs) to communicate large amounts of information such as that corresponding to the content 120 and/or software update 124.

Referring more particularly to FIG. 4, the flowchart 400 begins with a start step 402 and then next, at a step 404, a mobile data user with a mobile device having multi-mode (e.g., both cellular/WAN and Wi-Fi/WLAN) communications capabilities such as the mobile device 102 enters an area of coverage of one or more access points associated with respective Service Set Identifier(s) (SSID(s)). For example, with respect to FIG. 1, the mobile device 102 enters the coverage region 138 of the first access point 128, which will have an associated SSID. Assuming that, when this occurs, the mobile device 102 already is within a coverage region of a cell tower such as the coverage region 118 of the first cell tower 108 of FIG. 1 (which is typically the case), the mobile device 102 with its multi-mode communications capabilities thus is potentially able to communicate both with the cellular network 106 and also with the Wi-Fi network 126.

Next, at a step 406, it is determined at the mobile device 102 (e.g., by the processor 204) whether one or more preliminary criteria are met. The preliminary criteria are criteria that, if met, would signify that it is appropriate for the mobile device 102 to engage in establishing Wi-Fi communications via the Wi-Fi network 126 and, if such communications were established, appropriate to drop communications involving the cellular network 106. The preliminary criteria considered at the step 406 can vary depending upon the embodiment. In the present embodiment, for example, the mobile device 102 among other things considers whether the mobile device has been stationary (or substantially stationary) for a particular amount (x) of time. Also for example, the mobile device 102 can consider whether the signal strength vis-à-vis the first access point 128 (e.g., the signal strength of the third communication link 136) is greater than a predefined minimum threshold. Relatedly, the mobile device 102 can also consider whether one or more quality of service (QoS) criteria are met.

The first of the aforementioned preliminary criteria is of interest because, if the mobile device 102 is not stationary (or not substantially stationary), it is likely that the mobile device 102 will not remain within the coverage region 138 for a long enough time that a particular desired communication of information (e.g., communication of the content 120 to or from the mobile device 102, or communication of the software update 124 to the mobile device) can be accomplished. Whether the mobile device 102 is stationary (or substantially stationary) can be determined in any of a variety of manners, for example, by using one or more of the location circuits/components of the mobile device 102 as discussed above. As for the others of the aforementioned preliminary criteria, these can be of interest because, if one or more of signal strength or QoS characteristics are not satisfactory, then desired communications between the mobile device 102 and the first access point 128 can be rendered unreliable, impractical or futile. How exactly signal strength and/or QoS characteristics are measured and/or what levels or standards are acceptable can vary depending upon the embodiment. For example, signal strength can be measured based upon the strength (e.g., magnitude) level of the Wi-Fi signal received by the Wi-Fi transceiver 205 of the mobile device 102.

Although in the present embodiment one or more of the aforementioned preliminary criteria are taken into account at the step 406, in other embodiments a variety of other preliminary criteria also or instead can be taken into account. For example, in some other embodiments, the mobile device 102 at the step 406 considers whether it is within the coverage region (or range) of an access point such as the coverage region 138 of the first access point 128, or considers whether it has been within such a coverage region of an access point for more than a minimum amount of time, which can be also an indication as to whether the mobile device 102 will likely remain within range of the access point for a sufficient amount of time that desired communications can be achieved. Whether the mobile device is within the coverage region can itself be determined, for example, based upon ongoing signal strength measurements (or indications of whether there is adequate power available at one or both of the mobile device and/or the access point to allow for desired communications).

Yet another preliminary criterion that can be considered is whether the mobile device 102 is or is not in use (e.g., use involving communications via the cellular network 106 or other use that taxes processing or memory resources of the mobile device in a substantial manner). Depending upon whether usage of a particular type (or any usage at all) is occurring, a delay in the process of switching to Wi-Fi communications can be merited. Relatedly, a further criterion that can be considered is whether the mobile device 102 is off-peak in its use. If this is the case, it can be an opportune moment for Wi-Fi communications to begin. Additionally, in some cases further preliminary criteria that are considered by the mobile device 102 can include one or more of (i) whether an access point of interest such as the first access point 128 has ever been used before by the mobile device 102 for Wi-Fi communications, (ii) whether that access point is whitelisted, and/or (iii) whether that access point is blacklisted.

If at the step 406 it is determined that the preliminary criteria are not met, then the process advances to a step 408, at which the mobile device 102 continues to proceed with normal WAN-based (e.g., 3G) communications or data connectivity involving the cellular network 106 and the process then ends at a step 410. Alternatively, if at the step 406 it is determined that the preliminary criteria have been met, then the process advances to a step 412. At this step, the mobile device 102 automatically, without user awareness, launches a browser program such as the browser program 140 of FIG. 1 and attempts to establish communications with an access point having a coverage region in which the mobile device is located, such as the first access point 128 associated with the first coverage region 138, and correspondingly the third communication link 136 is established.

More particularly with respect to the attempt to establish communications at the step 412, this can in some cases (though need not always) be precipitated by a user of the mobile device 102 entering a web address into the browser program 140 with an intent to access a website associated with that web address, e.g., a website hosted at a web server such as the web server 104 unaffiliated with the first access point 128. Nevertheless, the step 412 does not itself represent an attempt to establish communications with a web server such as the web server 104 that is unassociated with the first access point 128. Rather, the step 412 constitutes an attempt by the mobile device 102 to establish communications with an access point such as the first access point 128 itself, or perhaps with another component of the WLAN with which that first access point is associated. More particularly, the activity occurring at the step 412 typically involves communications between the browser program 140 and the first access point 128, such as contacting the IP address of the AP web server 129 residing on (or otherwise associated with) the access point.

Execution of the step 412 is significant because, in some circumstances, communications via a Wi-Fi network such as the Wi-Fi network 126 is constrained by use requirements established by the owner or operator of the Wi-Fi network or the access point(s) that are part of (and allow accessing of) that network. Such use requirements can be encountered by the mobile device 102 as requirements of the web server(s) residing on or associated with (e.g., residing elsewhere on the WLAN) those access point(s), such as the AP web server 129. Often, addressing such use requirements is mandatory before the mobile device 102 can proceed with regular Wi-Fi communications via the access point. Indeed, even if the mobile device 102 is attempting to access another web address (e.g., that of the web server 104), the mobile device can be forcibly re-directed to the IP address of access point (e.g., the AP web server 129) to address the use requirements before the accessing of the other web address can proceed. In this context, the web server associated with the access point can be considered a re-direct server since the mobile device is re-directed to that server irrespective of any earlier instruction.

Assuming that in establishing communications with an access point such as the first access point 128 the mobile device 102 is directed to a web server of that access point such as the AP web server 129 (or a re-direct server/captive portal as discussed above, which can in some circumstances be located elsewhere other than at the access point itself), then at the step 412 in the present embodiment the browser program 140 of the mobile device 102 additionally utilizes known scripts to access, identify, and/or otherwise interact with standard screens (e.g., web pages) of that web server, so as to address use requirements or other issues. In the present embodiment, the browser program 140 particularly determines whether communication with the first access point 128 can be on a free basis or instead needs to be on a paid basis. Also, in the present embodiment, the browser program 140 identifies any terms or conditions (e.g., other requirements) that need to be met in order for communications with the first access point 128 to proceed.

Given this to be the case, upon taking such action at the step 412, the mobile device 102 in the present embodiment then takes several further actions to address the use requirements or other issues raised by the AP web server 129 of the first access point 128. More particularly, at a subsequent step 414 the mobile device 102 makes a determination of whether further communications via the first access point 128, as indicated by the information obtained during the step 412, can proceed on a free basis or instead can only proceed on a paid basis. As shown, if it is determined that the communications can only proceed on a paid basis, then the process advances from the step 414 again to the step 408. Consequently, normal WAN-based communications via the cellular network 106 continue to occur and then the process ends at the end step 410. Alternatively, if it is determined that the communications can proceed on a free (non-paying) basis, then the process further proceeds from the step 414 to a step 415.

Upon reaching the step 415, the mobile device 102 (particularly by way of the browser program 140) further determines whether there are any particular terms or conditions associated with communications via the first access point 128 (as identified at the step 412) that should be addressed before further communications via the first access point 128 and the Wi-Fi network 126 can proceed. If there are no terms or conditions that should be addressed before communications with the Wi-Fi network 126 via the first access point 128 can occur, then the process advances to a step 418. However, if there are one or more terms or conditions that should be addressed before communications with the Wi-Fi network can proceed, the process advances to a step 416, at which the mobile device 102 then further determines whether all such terms or conditions can be addressed on an automatic basis without further input from the mobile device user. If this is in fact the case, then the process advances from the step 416 to a step 417, at which all of the term(s) or condition(s) that should be addressed are automatically addressed by the mobile device 102 (via the browser program 140).

As further indicated by the step 417, user interaction need not always be required in addressing term(s) and condition(s) associated with establishing communications with the Wi-Fi network 126 even where addressing such term(s) or condition(s) involves more than a trivial, nonsubstantive issue. In particular, if the access point 106 has been utilized previously, it is possible that the mobile device 102 will have available to it various recorded (e.g., cached) response information or other information that can be used to address the term(s) or condition(s) at issue, such that the mobile device 102 is able to automatically respond to the terms or conditions requirements. In some cases, such cached or other stored response information available at the mobile device 102 can be information that was obtained at an earlier time when the mobile device 102 previously addressed the same term(s) or condition(s), such as when the mobile device 102 previously tried to establish communications with the Wi-Fi network 126 via the same access point (e.g., via the first access point 128). Regardless of the manner in which term(s) or condition(s) are automatically addressed at the step 417, the process then again advances to the step 418.

If at the step 416, however, it is determined that there are one or more terms or conditions that should be addressed before communications with the Wi-Fi network 126 via the first access point 128 can proceed, but that one or more of those terms or conditions are one(s) that cannot be automatically accepted or otherwise addressed, the process instead advances from the step 416 to a step 420. At the step 420, the browser program 140 provides an alert to the mobile device user (displayed on the display screen of the mobile device 102 for example) indicating that the user needs to accept a given term or condition or take some other action (e.g., provide additional input information) in order for communications with the Wi-Fi network 126 via the first access point 128 to proceed. If the user in response to receiving such alert provides sufficient input to allow for all term(s) or condition(s) to be addressed, then the process again advances to the step 418. However, if the user fails to do so (or fails to do so within a specified time period), then the process again proceeds to the step 408 at which the mobile device 102 continues to engage in WAN-based connectivity and after which the process ends at the step 410.

It should be added that, as mentioned above with respect to the step 417, in at least some embodiments in which terms or conditions are addressed automatically, this is able to occur because past user input information has been stored (e.g., cached). Given the value of such stored (e.g., cached) information during execution of the step 417 in certain circumstances, it should be recognized that the information input by a user at the step 420 in at least some embodiments is, as part of that step, stored on the mobile device (e.g., within the memory portion 206) for later use when the process of FIG. 4 is repeated and the step 417 is performed.

Assuming that the process advances to the step 418 from any of the steps 415, 417, or 420, the mobile device 102 ceases to communicate via the cellular network 106, that is, the WAN-based (e.g., 3G) connectivity is dropped/broken. At the same time (or substantially the same time) the mobile device 102 begins to communicate via the Wi-Fi network 126, particularly by way of the first access point 128 establishing the first coverage region 138 within which the mobile device 102 is positioned. When this occurs, in cases where the browser program 140 of the mobile device 102 was previously directed to a re-direct server such as the AP web server 129 notwithstanding an initial request to proceed to the web address of another web server such as the web server 104, the mobile device 102 is allowed finally to proceed to the initially-requested web server. Upon commencing communications via the Wi-Fi network 126 the process then is shown to end at the step 410. That said, it will be understood that communications via the Wi-Fi network 126 can continue on indefinitely until the information desired for transmission (e.g., the content 120 or the software update 124) is fully communicated to (or from) the mobile device 102.

In considering the operations of the flow chart 400, it should be noted that operations such as those of the steps 414-417 in which requirements of a re-direct server/captive portal are automatically addressed (by comparison with operations involving user input such as the step 420) can be particularly beneficial in that the mobile device 102 is able to relatively rapidly proceed to communications with the Wi-Fi network 126. More particularly, due to such rapid transitioning, it is possible for one or more applications (e.g., email, applications involving communications with a SNW, etc.) running on the mobile device 102 that wish to use the IP connection via the Wi-Fi network 126 to continue running (e.g., by entering into communication with the web server 104) without timing-out due to any absence of full connectivity. By comparison, if user input is required such as at the step 420, the precluding of such timing-out may not always be possible if it takes too long to receive the appropriate user input. Then again, in other circumstances, timing-out of applications on the mobile device 102 need not be a problem even where user input is required to proceed, to the extent that full WAN-based communications are maintained throughout the process up to the step 418.

Although not shown, it should also be understood that communications via the Wi-Fi network 126 can also be terminated and connectivity via the cellular network 106 can be restored at a time subsequent to the step 410. Such switching back from Wi-Fi communications to WAN-based communications can occur, for example, at a time after a desired information transmission has been completed (e.g., after the content 120 of interest or software update 124 has been fully communicated to its destination), at a predetermined time (e.g., a predetermined amount of time after communications with the Wi-Fi network 126 began), or at a time when communications via the Wi-Fi network 126 become impossible or undesirably poor (e.g., because a QoS criterion is no longer met or because the mobile device 102 has moved out of the first coverage region 138). Indeed, it should be understood that the switching back and forth between WAN-based and Wi-Fi communications involving the steps shown in FIG. 4 as well as other steps occurring after the step 410 (e.g., steps involving switching back from Wi-Fi communications to WAN-based communications) can be repeated over and over again.

Further, even though Wi-Fi communications via one access point such as the first access point 128 may occur and then be terminated when the mobile device 102 leaves the first coverage region 138 established by that access point, Wi-Fi communications can again be re-established when the mobile device enters other coverage region(s) such as a coverage region (not shown) established by the second access point 130. Indeed, the process of FIG. 4 can be repeated on multiple occasions in relation to multiple access points as the mobile device 102 enters and/or exits coverage regions associated with those access points. Although not intended to be the primary focus of FIG. 4, it also should be understood that WAN-based communications via the cellular network 106 can stop and start as the mobile device 102 enters and/or exits coverage regions associated with cell towers such as the first coverage region 118 associated with the first cell tower 108. However, in contrast to the coverage regions associated with different access points, which may not be contiguous or overlap, the coverage regions associated with different cell towers typically are configured to be contiguous/overlap such that the mobile device 102 need not start and stop cellular communications for this reason.

Although not shown in FIG. 1, it will further be understood that, in some embodiments, a mobile device can potentially enter into communications with any of several access points while at a given location. In some such embodiments, multiple respective use requirements can exist with respect to the respective different access points, all of which are accessible by the same mobile device. For example, in some embodiments, the mobile device 102 can potentially access multiple (e.g., n) access points, and any IP address contacted can be one of several (e.g., n) IP addresses respectively associated with the respective access points. In some such circumstances, the preliminary criteria considered at the step 406 can be considered with respect to each of several different access points, and the IP address(es) contacted at the step 412 can be ones associated with the access point(s) for which preliminary criteria have been considered and determined to be met at the step 406. Likewise, in some such circumstances, the mobile device 102 can determine whether the additional criteria considered at the steps 414-420 are satisfied with respect to more than one access point and proceed to communicate with one or more particular access point(s) depending upon these determinations.

Turning to FIG. 5, the schematic diagram 500 shows additional example operation of the system 100 of FIG. 1. In particular, as will be discussed further below, the process of FIG. 5 finds particular application in regards to the communication of software updates such as the software update 124 to mobile devices such as the mobile device 102 from a source of such information such as the web server 104. As already discussed with respect to FIG. 1, the web server 104 can take a variety of forms depending upon the embodiment (and need not even be a web server per se). For purposes of the present embodiment, it is assumed that the web server 104 is configured to serve as an intermediary between mobile devices such as the mobile device 102 and other devices, for example, one or more CPWs and also to serve as a source of software updates.

Further in this regard, the web server can be (but need not be) a device management (DM) server that employs a separate or distinct protocol that is particularly helpful in communicating software upgrade packages (as well as possibly various parameters, device information and settings). As will be discussed further below, assuming that the web server 104 is a DM server, a device management session can be used to deliver access point configuration/credential information to leverage Wi-Fi communications for the delivery of the software update 124. Further, use of the DM server also makes it possible for the system 100 (and particularly the mobile device 102) to gain information as to when a software update (upgrade) is available.

Further with respect to FIG. 5, the process represented by the schematic diagram 500 begins at step 502, at which the mobile device 102 is directed or commanded to turn on its Wi-Fi communications capability by the web server 104. That is, the web server (e.g., DM server) 104 sends a command to the mobile device 102 instructing the mobile device to turn on this capability. In providing this command at the step 502, specific service set identifiers (SSIDs) can be included as part of the command. In at least some circumstances, such information is delivered within an Open Mobile Alliance (OMA) DM session/package. It should further noted that, in at least some embodiments, the step 502 particularly occurs only after the DM server (operator) detects that a software upgrade such as the software update 124 has become available for a given mobile device or group of mobile devices. In this regard, the command provided at the step 502 can be considered a trigger to the mobile device 102 indicating that a software update is available and that the mobile device 102 should begin the process of establishing Wi-Fi communications so as to allow downloading of the software update via the Wi-Fi communications link. Further, once the availability of the software upgrade is detected, the DM server queues the software upgrade until such time as the mobile device 102 responds to the command provided at the step 502 by establishing Wi-Fi connectivity.

Following the step 502, at additional steps 504 and 506 the mobile device 102 further communicates with the web server 104 regarding credential information. The additional steps 504 and 506 can be considered optional, and in some embodiments are not performed (for that reason, the arrows corresponding to the steps 504 and 506 are shown to be dashed). Nevertheless, in the present embodiment, at the additional step 504, the mobile device 102 sends a message to the web server 104 in which the mobile device requests credentials of the web server. Then, at the additional step 506, the web server responds with the requested credential information. Although not shown, depending upon the type of credential information or the characteristics of the credential information provided from the web server 104 at the additional step 506, the mobile device 102 can decide to proceed or not proceed with further actions resulting in connectivity by way of the Wi-Fi network 126 and potentially, if ultimately Wi-Fi connectivity is not pursued, remain connected to the cellular network 106.

Although not shown in FIG. 5, depending upon the embodiment, additional techniques can also be or instead be employed by the mobile device 102 in determining whether to proceed with Wi-Fi connectivity. For example, the mobile device 102 can operate so that one or more ports are blocked such that the Wi-Fi connectivity is used only for the purpose of receiving software upgrades such as the software update 124 but not for other types of data communications such as communication of the content 120. Also, as indicated by the points A and B shown in FIGS. 4 and 5, in at least some embodiments one or more of the steps 406-418 of FIG. 4 can be performed (that is, between the points A and B) as part of the process represented by FIG. 5 subsequent to the step 506, to determine whether the mobile device 102 should or can enter into Wi-Fi connectivity with an access point such as the first access point 128 so as to allow for further communications with the web (DM) server 104 via the Wi-Fi network 126.

Subsequent to the step 506 (and subsequent to any additional steps mentioned above, such as those of steps 406-418 of FIG. 4), at a step 508 the mobile device 102 then provides the web (DM) server 104 with a notification that the mobile device 102 has Wi-Fi connectivity suitable for transmission of the software update 124. Further as shown, upon completion of the step 508, then at a step 510 the software update (upgrade package) 124 is transmitted to the mobile device 102. As a result of the receiving of the software update, existing software program(s) stored in the memory portion 206 of the mobile device 102 (which can be understood to include, but not be limited to, the browser program 140) is/are supplemented by, and/or modified by (including replaced or deleted) the software update information. Further, at a step 512, an acknowledgment is sent back from the mobile device 102 for receipt by the web (DM) server 104 that the software update 124 has been delivered. Finally, at a step 514, once the software update has been communicated to the mobile device 102 and the acknowledgment has been provided back to the web server 104 indicating such communication, then at the step 514 the mobile device is instructed by the web server 104 to disable Wi-Fi communications, and thus correspondingly to revert to the original (e.g., cellular) connectivity.

From the above discussion, therefore, it should be appreciated that the process for allowing software updates such as the software update 124 to be communicated to a mobile device by way of Wi-Fi connectivity instead of WAN-based connectivity can in some embodiments entail one or more steps that are different from those of the process of FIG. 4. Such steps can be particularly warranted since, in such circumstances, the web server 104 can have a special relationship with the mobile device, for example, where the operator of the web server is the manufacturer of the mobile device and has particularly relevant information regarding when software upgrades are arriving that can be of value to the mobile device. At the same time, notwithstanding the above discussion, it should be understood that a variety of implementations and processes are intended to be encompassed by the above disclosure, and the above embodiments are merely exemplary.

Therefore, it is specifically intended that the present invention not be limited to the embodiments and illustrations contained herein, but include modified forms of those embodiments including portions of the embodiments and combinations of elements of different embodiments as come within the scope of the following claims.

The invention claimed is:

1. With respect to a mobile device capable of communicating wirelessly via a Wide Area Network (WAN) communication link, a method of operating the mobile device comprising:
   (a) receiving a command from a remote server, via the WAN communication link, to establish a Wi-Fi communication link when possible, the command indicating that software update information is available;
   (b) taking at least one action in response to the command indicating that the software update information is available so as to establish the Wi-Fi communication link;
   (c) upon establishing the Wi-Fi communication link, sending a message for receipt by the remote server indicating that the Wi-Fi communication link has been established in response to the command indicating that the software update information is available;
   (d) receiving the software update information from the remote server, the software update information being communicated to the mobile device via the Wi-Fi communication link; and
   (e) receiving an instruction from the remote server that communications via the Wi-Fi communication link be ended.

2. The method of claim 1, further comprising subsequent to (a):
   sending a request for receipt by the remote server, via the WAN communication link, for credential information; and
   receiving the credential information via the WAN communication link as provided by the remote server.

3. The method of claim 2, wherein the Wi-Fi communication link at (b) is established only if one or more first criteria relating to one or more operational characteristics of one or both of access points (APs) and the mobile device are met, and further comprising, in (e), sending an acknowledgement for receipt by the remote server indicating that the software update information has been received.

4. The method of claim 1, wherein the Wi-Fi communication link at (b) is established only if the mobile device is able to satisfy one or more terms or conditions required to be met before communications with access points (APs) can proceed, either automatically or after receiving user input information.

5. The method of claim 4, wherein the mobile device includes at least one processor, wherein the at least one processor causes an alert message to be output for receipt by a user of the mobile device, the alert message requesting entry of the user input information, and wherein the one or more terms or conditions are satisfied only upon receiving the user input information.

6. The method of claim 5, wherein the mobile device satisfies the one or more terms or conditions required to be met by way of communications via the WAN communication link.

7. The method of claim 1, wherein the remote server is a device management (DM) server and wherein the mobile device interacts with one or both of the DM server and a re-direct server by way of a browser program or client operating on the mobile device.

8. The method of claim 7, wherein the command includes one or more service set identifiers (SSIDs) and at least some of the information of the command is delivered within an Open Mobile Alliance (OMA) DM session/package.

9. The method of claim 8, wherein the software update information concerns at least one of a software upgrade, a patch, a new application to be installed on the mobile device, or firmware of the mobile device.

10. A mobile device capable of conducting both Wide Area Network (WAN) communications and Wi-Fi communications, the mobile device comprising:
at least one memory portion storing a first program that is either a browser program or another client program;
a first communication device having one or both of a first transmitter and a first receiver capable of conducting the WAN communications via a WAN communication link;
a second communication device having one or both of a second transmitter and a second receiver capable of conducting the Wi-Fi communications via a Wi-Fi communication link; and
at least one processor portion at least indirectly in communication with each of the at least one memory portion, the first communication device, and the second communication device,
wherein upon receiving, from a remote server via the WAN communication link, a command to establish the Wi-Fi communication link when possible, the second communication device conducts the Wi-Fi communications, the command indicating that software update information is available,
wherein upon the Wi-Fi communication link being established, the mobile device sends a message for receipt by the remote server indicating that the Wi-Fi communication link has been established in response to the command indicating that the software update information is available, and further,
wherein the first program is executed by the at least one processor portion so that, as a result of the Wi-Fi communications, the software update information from the remote server is received and stored upon the at least one memory portion of the mobile device.

11. The mobile device of claim 10, wherein prior to receiving the software update information, the mobile device engages in the WAN communications so as to request and then receive credential information from the remote server.

12. The mobile device of claim 11, wherein subsequent to the receiving of the software update information, the mobile device further sends, for receipt by the remote server, an acknowledgement indicating that the mobile device has received the software update information and the mobile device further receives an instruction from the remote server that communications via the Wi-Fi communication link be ended and to revert to cellular connectivity.

13. The mobile device of claim 10, wherein a plurality of software programs including the first software program are stored on the at least one memory portion, and wherein as a result of the receiving of the software program, either the plurality of software programs are supplemented by one or more additional software programs or one or more of the plurality of software programs are deleted, replaced, or modified.

14. The mobile device of claim 10, wherein the mobile device is one of a cellular telephone, a personal digital assistant, or a smart phone.

15. With respect to a mobile device capable of communicating wirelessly via a Wide Area Network (WAN) communication link, a method of operating the mobile device comprising:
(a) receiving a command from a remote server, via the WAN communication link, to establish a Wi-Fi communication link when possible, the command indicating that software update information is available;
(b) sending a request for receipt by the remote server, via the WAN communication link, for credential information in response to the command indicating that the software update information is available;
(c) receiving the credential information via the WAN communication link as provided by the remote server;
(d) taking at least one action in response to the command indicating that the software update information is available so as to establish the Wi-Fi communication link;
(e) upon establishing the Wi-Fi communication link, sending a message for receipt by the remote server indicating that the Wi-Fi communication link has been established in response to the command indicating that the software update information is available; and
(f) receiving the software update information from the remote server, the software update information being communicated to the mobile device via the Wi-Fi communication link.

16. The method of claim 15, further comprising:
(g) receiving an instruction from the remote server that communications via the Wi-Fi communication link be ended and to revert to cellular connectivity.

17. The method of claim 16, wherein the software update information concerns at least one of a software upgrade, a patch, a new application to be installed on the mobile device, and firmware of the mobile device, and wherein (g) also includes sending an acknowledgement for receipt by the remote server indicating that the software update information has been received.

18. The method of claim 15, wherein (d) includes determining whether one or more criteria are met prior to conducting ongoing communications via the Wi-Fi communication link.

* * * * *